United States Patent
Lin et al.

(10) Patent No.: US 9,746,745 B1
(45) Date of Patent: Aug. 29, 2017

(54) ZOOM LENS AND METHOD FOR MANUFACTURING THE SAME

(71) Applicant: INDUSTRIAL TECHNOLOGY RESEARCH INSTITUTE, Hsinchu (TW)

(72) Inventors: Chien-Wen Lin, Taoyuan (TW); Yi-Lang Tsai, Taichung (TW); Shih-Hsien Liu, Jhubei (TW); Kung-Lung Cheng, Hsinchu (TW); Huang-Ming Philip Chen, Zhubei (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 15/388,694

(22) Filed: Dec. 22, 2016

(30) Foreign Application Priority Data

Oct. 11, 2016 (TW) ............................. 105132697 A

(51) Int. Cl.
 *G02B 3/14* (2006.01)
 *G02F 1/29* (2006.01)
 *G02F 1/1343* (2006.01)

(52) U.S. Cl.
 CPC .............. *G02F 1/29* (2013.01); *G02B 3/14* (2013.01); *G02F 1/134309* (2013.01);
 (Continued)

(58) Field of Classification Search
 CPC .. G02F 2001/294; G02F 1/29; G02F 2203/28; G02F 1/134309; G02B 3/14
 (Continued)

(56) References Cited

U.S. PATENT DOCUMENTS 6,191,881 B1 * 2/2001 Tajima .............. G02F 1/134309
349/200
6,859,333 B1 2/2005 Ren et al.
(Continued)

FOREIGN PATENT DOCUMENTS

| JP | 2013-237842 A | * 11/2013 |
| TW | I271431 | 1/2007 |
| TW | 201011350 | 3/2010 |

OTHER PUBLICATIONS

Computer-generated translation of JP 2013-237842 (Nov. 2013).*
(Continued)

*Primary Examiner* — John A McPherson
(74) *Attorney, Agent, or Firm* — Birch, Stewart, Kolasch & Birch, LLP

(57) ABSTRACT

A zoom lens is provided, which includes an electrode pattern on a substrate, and a liquid-crystal material on the electrode pattern. The electrode pattern includes a plurality of concentric ring electrodes surrounding an innermost electrode. Each of the concentric ring electrodes has an opening. A first trace extends from a first electrode out of an outermost concentric ring electrode to the innermost electrode. The first trace has greater resistance than the concentric ring electrodes and the innermost electrode. A second trace connecting the innermost electrode and a second electrode out of the outermost concentric ring electrode through the openings. The liquid-crystal material includes a liquid-crystal compound with a chemical structure of
(Continued)

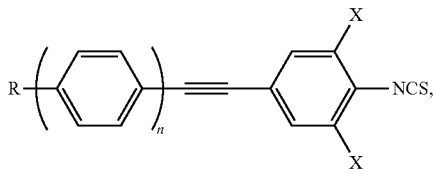

wherein R is $C_{4-10}$ alkyl group, n=1 or 2, and each of X is independently H or F.

16 Claims, 6 Drawing Sheets

(52) U.S. Cl.
CPC .. *G02F 2001/294* (2013.01); *G02F 2201/122* (2013.01); *G02F 2203/28* (2013.01)

(58) Field of Classification Search
USPC .......................................... 349/200; 430/321
See application file for complete search history.

(56) References Cited

U.S. PATENT DOCUMENTS 7,724,347 B2  5/2010  Tseng et al.
2012/0274891 A1* 11/2012 Biring ............... G02F 1/134309
                                                           349/200
2014/0132904 A1  5/2014  Bos et al.

OTHER PUBLICATIONS

Chao et al., "A New Negative Liquid Crystal Lens With Multiple Ring Electrodes in Unequal Widths", IEEE Photonics Journal, vol. 4, No. 1, Feb. 2012, pp. 250-266.
Chu et al., "Novel fabrication process of liquid crystal lens with multi-ring electrodes", National Chiao Tung University, 2014, total No. p. 1(Abstract).
Dabrowski et al., "High Birefringence Liquid Crystals", Crystals, vol. 3, 2013, pp. 443-482.
Gauza et al., "High Birefringence Isothiocyanato Tolane Liquid Crystals", The Japan Society of Applied Physics, vol. 42, No. 6A, Part 1, Jun. 2003, pp. 3463-3466.
Kao et al., "A new low-voltage-driven GRIN liquid crystal lens with multiple ring electrodes in unequal widths", Optical Express, vol. 18, No. 18, Aug. 30, 2010, pp. 18506-18518.
Lin et al., "A fast response and large electrically tunable-focusing imaging system based on switching of two modes of a liquid crystal lens", Applied Physics Letters, vol. 97, 2010, pp. 063505-1 to 063505-3.
Ren et al., "Adaptive liquid crystal lens with large focal length tenability", Optical Express, vol. 14, No. 23, Nov. 13, 2006, pp. 11292-11298.

* cited by examiner

ZOOM LENS AND METHOD FOR MANUFACTURING THE SAME

CROSS REFERENCE TO RELATED APPLICATIONS

The present application is based on, and claims priority from, Taiwan Application Serial Number 105132697, filed on Oct. 11, 2016, the disclosure of which is hereby incorporated by reference herein in its entirety.

TECHNICAL FIELD

The technical field relates to a zoom lens.

BACKGROUND

Liquid-crystal lenses have the potential to serve as components used in optical image formation, in sensors, and in similar applications. This is due the properties of liquid-crystal lens, such as a small volume (i.e. thin shape), an electrically-tunable optical zoom, a fast response, and low energy consumption. A liquid-crystal lens includes liquid-crystal material and a lens device, which should be collocated to achieve the desired effect. The birefringence and viscosity of the liquid-crystal material directly influence the focal length and the electrically-tunable speed of the lens. Conventional liquid-crystal materials usually have a birefringence of less than 0.2. A liquid-crystal material with a birefringence greater than or equal to 0.25 should be developed to satisfy the optical requirements of such a lens. In addition, a lens with a conventional mechanical voice coil motor has a slow focusing speed, whereas a liquid lens has the advantage of a fast electrically-tunable zoom speed. Liquid-crystal with a low viscosity may accelerate the driving electric field. In the design of a lens, the conventional concentric ring electrodes require a plurality of etching and lithography processes, and different voltages are independently applied to each of the concentric ring electrodes. Too many electrodes may result in optical leakage of the lens, thereby reducing the optical signals. Accordingly, a liquid-crystal material with excellent optical-electrical properties is called for, and the processes for fabricating the electrodes should be simplified to efficiently make the liquid-crystal lens be more competitive.

SUMMARY

One embodiment of the disclosure provides a zoom lens, including an electrode pattern on a substrate; and a liquid-crystal material on the electrode pattern. The electrode pattern includes a plurality of concentric ring electrodes surrounding an innermost electrode, a first trace, and a second trace. Each of the concentric ring electrodes has an opening. The first trace extends from a first electrode out of the outermost concentric ring electrode to the innermost electrode. The first trace has greater resistance than that of the concentric ring electrodes and the innermost electrode. The second trace connects the innermost electrode and a second electrode out of the outermost concentric ring electrode through the openings. The liquid-crystal material includes a liquid-crystal compound with a chemical structure of

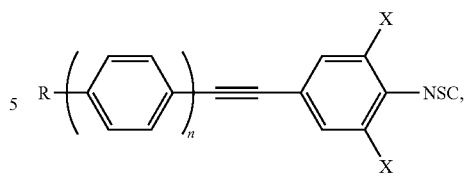

wherein R is $C_{4-10}$ alkyl group, n=1 or 2, and each of X is independently H or F.

One embodiment of the disclosure provides a method of manufacturing a zoom lens, including: depositing a transparent conductive oxide on a substrate; patterning the transparent conductive oxide by lithography and etching to form a plurality of concentric ring electrodes surrounding an innermost electrode, a first electrode, a second electrode, and a second trace, wherein the first electrode and the second electrode are disposed outside an outermost concentric ring electrode, each of the concentric ring electrodes has an opening, and the second trace connects the innermost electrode and the second electrode through the openings; spray coating a transparent conductive polymer to form a first trace, wherein the first trace extends from the first electrode to the innermost electrode, wherein the first trace has greater resistance than that of the concentric ring electrodes, the innermost electrode, the first electrode, the second electrode, and the second trace; and forming a liquid-crystal material on the concentric ring electrodes, the innermost electrode, the first electrode, the second electrode, the first trace, and the second trace. The liquid-crystal material includes a liquid-crystal compound with a chemical structure of

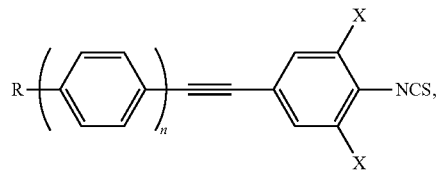

wherein R is $C_{4-10}$ alkyl group, n=1 or 2, and each of X is independently H or F.

A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawings, wherein.

DETAILED DESCRIPTION

Figure 1:
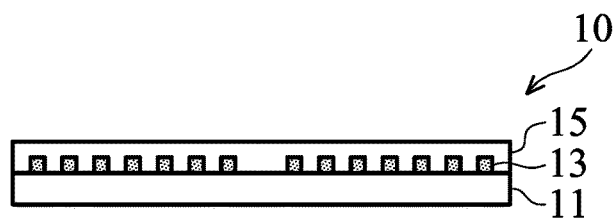
FIG. 1 shows a cross-sectional view of a zoom lens in one embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
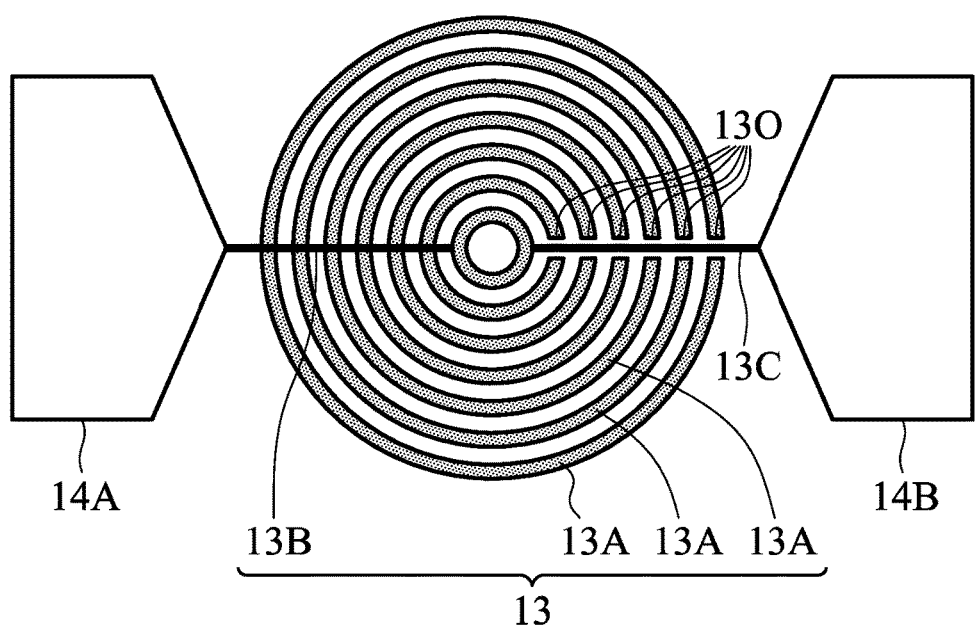
FIGS. 2 and 3 show top views of electrode patterns in embodiments.

FIG. 1 shows a cross-sectional view of a zoom lens 10 in one embodiment. The zoom lens includes an electrode pattern 13 on a substrate 11, and a liquid-crystal material 15 on the electrode pattern 13. FIG. 2 shows a top-view of the electrode pattern 13 in one embodiment. The electrode pattern 13 includes a plurality of concentric ring electrodes 13A (each includes an opening 130) surrounding an innermost concentric ring electrode 13A (ring-shaped electrode without an opening), a first trace 13B extending from a first electrode 14A (outside an outermost concentric ring electrode 13A) to the innermost concentric ring electrode 13A, and a second trace 13C extending from a second electrode 14B (outside the outermost concentric ring electrode 13A) to the innermost concentric ring electrode 13A through the openings 130. In one embodiment, each of the concentric ring electrodes 13A has a width of about 8 µm to 15 µm, and the adjacent concentric ring electrodes 13A are separated by a distance of about 8 µm to 15 µm. The openings 130 have a greater width than that of the second trace 13C. In other words, the second trace 13C only contacts the innermost concentric ring electrode 13A and the second electrode 14B without contacting the other concentric ring electrodes 13A.

Figure 3:
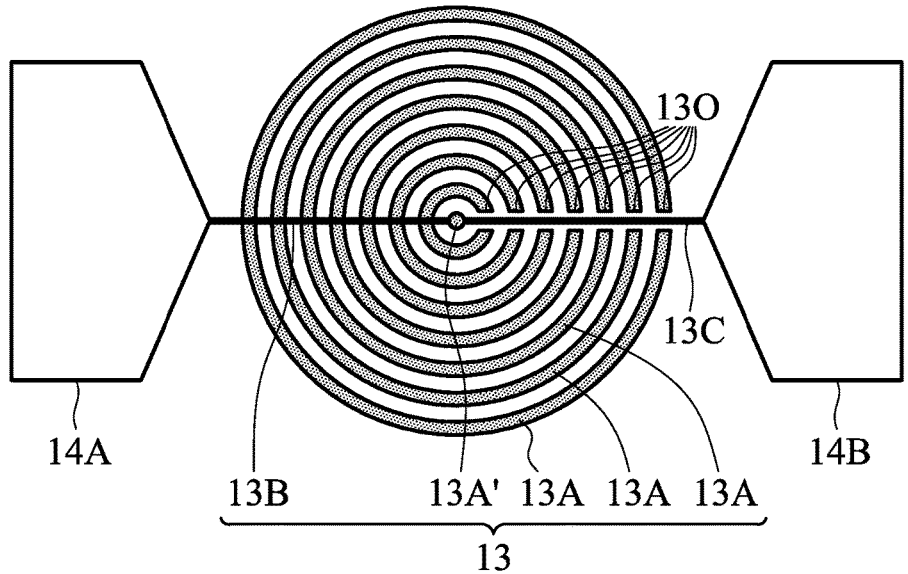

The width of the concentric ring electrodes 13A and the distance between the two adjacent concentric ring electrodes 13A are used to control the birefringence distribution of the liquid-crystal material. The electric fields may interfere with each other by the concentric ring electrodes 13A being too narrow and the distance between the two adjacent concentric ring electrodes 13A being too short. The liquid-crystal cannot be controlled by concentric ring electrodes 13A that are too wide and adjacent concentric ring electrodes 13A that are too far apart. Note that the different concentric ring electrodes 13A may have different widths, and the two different adjacent concentric ring electrodes 13A may have a different distance therebetween, if necessary. Alternatively, an innermost electrode surrounded by the concentric ring electrodes 13A is a filled circle electrode 13A', as shown in FIG. 3. In this embodiment, the first trace 13B also extends to the filled circle electrode 13A', and the second trace 13C only connects the innermost filled circle electrode 13A' and the second electrode 14B (without contacting the other concentric ring electrodes 13A).

In one embodiment, the first trace 13B has a width of 6 µm to 10 µm. An overly narrow first trace 13B may result in an overly long zoom time of the liquid-crystal lens. An overly wide first trace 13B may make the lens lose its zooming effectiveness. Although the seven concentric ring electrodes 13A are shown in the drawing, more or fewer than seven concentric ring electrodes 13A can be used. Although only one first trace 13B is shown in the drawing, more than one first trace 13B can be used. For example, if the electrode pattern 13 has a width of 3 mm, and both the line width and the distance between the two adjacent concentric ring electrodes 13A are 10 µm, the 75 concentric ring electrodes 13A can be used.

In one embodiment, the substrate 10 is made of transparent material such as glass or plastic. In one embodiment, the concentric ring electrodes 13A, the filled circle electrode 13A', the first electrode 14A, the second electrode 14B, and the second trace 13C can be made of transparent conductive oxide such as indium tin oxide, indium zinc oxide, or aluminum zinc oxide, and can be defined by lithography and etching processes. In one embodiment, the first trace 13B can be made of transparent conductive polymer such as poly(3,4-ethylenedioxythiophene):polystyrene sulfonate (PEDOT:PSS), and can be defined by a spray coating process.

For example, a PEDOT:PSS strip line with a width of 6 µm to 10 µm can be printed by aerosol spray coating to serve as the first trace 13B. The PEDOT:PSS strip line with a specific line width may have a resistance that does not match the impedance of the capacitance of the liquid-crystal layer. Compared to other highly resistive materials (e.g. CNT or graphene), the PEDOT:PSS is more stable during spray coating. The PEDOT:PSS strip line may absorb light with a wavelength of 900 nm to 2000 nm and be almost free of absorbing visible light with a wavelength less than 800 nm. As such, the PEDOT:PSS strip line has excellent light transmittance in the visible light spectrum. The PEDOT:PSS strip line can be spray coated on the electrodes by an aerosol jet printing (AJP) system, such that the voltage continuously decays on the PEDOT:PSS strip line and is delivered to the ITO electrodes connected to the PEDOT:PSS strip line. After assembling the elements to be driven by voltage, the liquid-crystal lens is complete. Compared to the electrode pattern of a conventional liquid-crystal lens, the processes for manufacturing the described electrode pattern are easier, less time-consuming, and less costly. When a voltage is applied to the electrode pattern, the first trace 13B of PEDOT:PSS may serve as a resistor, and the voltage decays from the input end to the innermost electrode, in which every contact of the PEDOT:PSS strip line and each of the ITO electrodes may serve as a node. The voltage of each of the concentric ring electrodes is determined by the voltage of the corresponding node, thereby forming a symmetrical (to the circle center) and smooth electric field distribution. The follow-up injected liquid-crystal material therefore has a symmetrical (to the circle center) and smooth birefringence distribution.

Because the resistance of the first trace 13B is much higher than that of the concentric ring electrodes 13A (and the filled circle electrode 13A'), the outermost concentric ring electrode 13A close to the first electrode 14A and the second electrode 14B is electrically conducted first, the inner concentric ring electrodes 13A are sequentially electrically conducted, and the innermost concentric ring electrode 13A or the filled circle electrode 13A' is electrically conducted last when voltage is applied to the electrode pattern 13. Therefore, the voltage is progressively increased or decreased from the outermost concentric ring electrode 13A to the innermost concentric ring electrode 13A or the filled circle electrode 13A', thereby tuning the axis directions of the liquid-crystal material 15 thereon to achieve the zoom effect. If the resistance of the first trace 13B is lower than or equal to that of the concentric ring electrodes 13A, the outermost concentric ring electrode 13A and the innermost concentric ring electrode 13A will be simultaneously electrically conducted, such that the entire electrode pattern 13 will have the same voltage and the zoom effect will be lost.

In one embodiment, the liquid-crystal material 15 includes a liquid-crystal compound as:

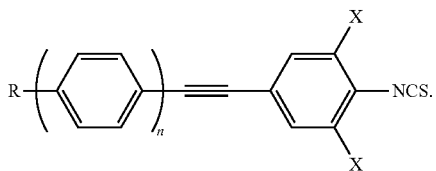

In the above formula, R is $C_{4-10}$ alkyl group, n=1 or 2, and each of X is independently H or F. In one embodiment, 100 parts by weight of the liquid-crystal material 15 includes 14 to 35 parts by weight of the described liquid-crystal compound. For example, 100 parts by weight of the liquid-crystal material 15 includes 3 to 11 parts by weight of

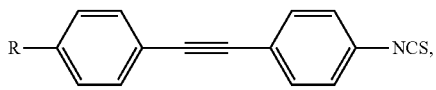

4 to 11 parts by weight of

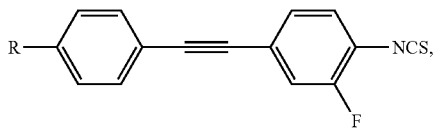

5 to 16 parts by weight of

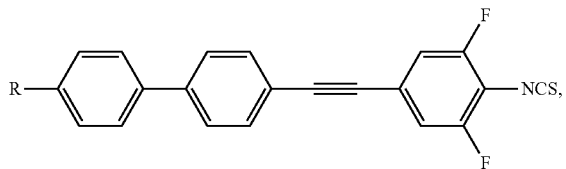

or a combination thereof. The liquid-crystal compound of an overly high loading may precipitate out from the liquid-crystal material 15. The liquid-crystal material 15 cannot have the desired properties (e.g. high birefringence) with the liquid-crystal compound of an overly low loading.

In one embodiment, the liquid-crystal compound may collocate with a commercially available liquid-crystal mixture to form the liquid-crystal material 15, which may have a birefringence of 0.25 to 0.31 and a viscosity at room temperature (25° C.) of 29 mPa·s to 36 mPa·s. The liquid-crystal material 15 with an overly low birefringence cannot efficiently reduce the shortest focal length of the lens. The liquid-crystal material 15 with an overly high viscosity at room temperature may increase the focus time and slow the focus speed.

In one embodiment, the zoom lens can be formed by the following method. A transparent conductive oxide is deposited on a substrate, and then patterned by lithography and etching processes to form a plurality of concentric ring electrodes surrounding an innermost electrode, a first electrode, a second electrode, and a second trace. The first electrode and the second electrode are disposed outside an outermost concentric ring electrode, and each of the concentric ring electrodes has an opening, so that the second trace connects the innermost electrode and the second electrode through the openings. A transparent conductive polymer is spray coated to form a first trace, and the first trace extends from the first electrode to the innermost electrode, wherein the first trace has a greater resistance than the concentric ring electrodes, the innermost electrode, the first electrode, the second electrode, and the second trace. Finally, a liquid-crystal material is formed on the concentric ring electrodes, the innermost electrode, the first electrode, the second electrode, the first trace, and the second trace. The compositions of the transparent conductive oxide, the transparent conductive polymer, and the liquid-crystal material are similar to those described above, and the related description is omitted here.

Below, exemplary embodiments will be described in detail with reference to the accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLES

Comparative Example 1

The composition of a liquid-crystal mixture (IBL-087, commercially available from Merck) is listed in Table 1.

TABLE 1

| wt % | Chemical structures of liquid-crystal molecules |
|---|---|
| 15 | $C_5H_{11}$—⟨cyclohexyl⟩—⟨phenyl⟩—⟨phenyl⟩—CN |
| 14 | $C_2H_5$—⟨phenyl⟩—⟨phenyl⟩—CN |
| 34 | $C_5H_{11}$—⟨phenyl⟩—⟨phenyl⟩—CN |
| 13 | $C_2H_5$—⟨phenyl⟩—COO—⟨phenyl⟩—CN |
| 15 | $C_3H_7$—⟨phenyl⟩—⟨phenyl⟩—CN |
| 10 | $C_3H_7$—⟨phenyl⟩—COO—⟨phenyl⟩—CN |

The liquid-crystal mixture IBL-087 was analyzed by an Abbe refractometer DR-M2 (commercially available from ATAGO) to measure its birefringence ($\Delta n=0.229$); analyzed by a liquid-crystal evaluation instrument LCAS 1 (commercially available from LCAS) to measure its dielectric anisotropy (Δ∈=15.5); analyzed by a viscometer CAP1000L (commercially available from Brookfield) to measure its viscosity at room temperature (η=31 mPa·s, 25° C.); and analyzed by a differential thermal analyzer DSC Q10 (commercially available from Texas Instruments) to measure its clear point (Tc=88.3° C.).

Comparative Example 2

The liquid-crystal molecule 5BBTB(FF)CN (See following chemical structure, commercially available from Aldrich) was mixed with the liquid-crystal mixture IBL-087 in different ratios to form liquid-crystal materials. The properties of the liquid-crystal materials are listed in Table 2, and the instruments for measuring the properties were similar to those in Comparative Example 1.

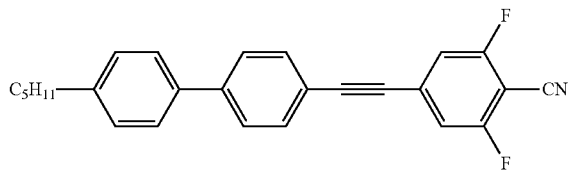

TABLE 2

| 5BBTB(FF)CN (wt %) | IBL-087 (wt %) | Δn | Δϵ | η (mPa · s) | Tc |
|---|---|---|---|---|---|
| 5 | 95 | 0.239 | 16.8 | 35 | 92.7° C. |
| 10 | 90 | 0.247 | 18.1 | 38 | 96.4° C. |
| 15 | 85 | 0.256 | 18.3 | 41 | 99.8° C. |

The liquid-crystal molecule 5BBTB(FF)CN had a birefringence (Δn) of 0.409 and a dielectric anisotropy (Δ∈) of 35.1, which were calculated by an extrapolation method. However, the liquid-crystal material with too little of the liquid-crystal molecule 5BBTB(FF)CN had an insufficient birefringence (e.g. <0.25). If the liquid-crystal material had a desired birefringence (e.g. >0.25), too much of the liquid-crystal molecule 5BBTB(FF)CN would make the liquid-crystal material have an overly high viscosity at room temperature (>40 mPa·s).

Comparative Example 3

The liquid-crystal molecule 5BBTB(FF)F (See following chemical structure, commercially available from Aldrich) was mixed with the liquid-crystal mixture IBL-087 in different ratios to form liquid-crystal materials. The properties of the liquid-crystal materials are listed in Table 3, and the instruments for measuring the properties were similar to those in Comparative Example 1.

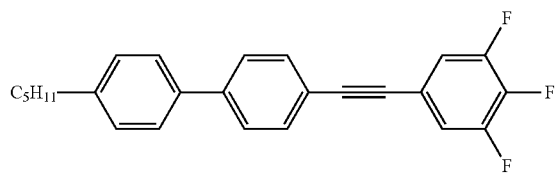

TABLE 3

| 5HBTB(FF)F (wt %) | IBL-087 (wt %) | Δn | Δϵ | η (mPa · s) | Tc |
|---|---|---|---|---|---|
| 5 | 95 | 0.235 | 15 | 32 | 93.9° C. |
| 10 | 90 | 0.243 | 16 | 34 | 97.4° C. |
| 15 | 85 | 0.250 | 15.8 | 35 | 99.2° C. |

The liquid-crystal molecule 5BBTB(FF)F had a birefringence (Δn) of 0.369 and a dielectric anisotropy (Δ∈) of 19, which were calculated by an extrapolation method. The liquid-crystal molecule 5BBTB(FF)F would not dramatically increase the viscosity at room temperature of the liquid-crystal material, but its overly low dielectric anisotropy could not efficiently increase the birefringence of the liquid-crystal material.

Comparative Example 4

The composition of a liquid-crystal mixture (E44, commercially available from Merck) is listed in Table 4.

TABLE 4

| wt % | Chemical structures of liquid-crystal molecules |
|---|---|
| 5 | $C_5H_{11}$—⬡—⬡—$C_3H_7$ |
| 7 | $C_2H_5$—⏣—⏣—CN |
| 3 | $C_3H_7$—⏣—⏣—CN |
| 22 | $C_5H_{11}$—⏣—⏣—CN |
| 3 | $C_3H_7$—⬡—⬡—⏣—F |
| 5 | $C_2H_5$—⬡—⬡—⏣(F,F,F) |
| 5 | $C_3H_7$—⬡—⬡—⏣(F,F,F) |
| 2.5 | $C_3H_7$—⬡—⬡—⏣—Cl |
| 3 | $C_5H_{11}$—⬡—⬡—⏣—Cl |

TABLE 4-continued

| wt % | Chemical structures of liquid-crystal molecules |
|---|---|
| 10 | 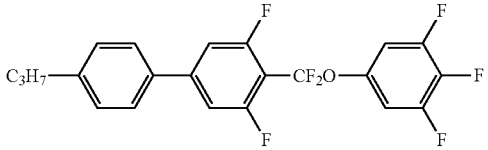 |
| 24 | 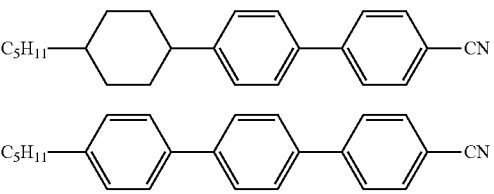 |
| 10.5 |  |

The liquid-crystal mixture E44 had a birefringence (Δn) of 0.248, a dielectric anisotropy (Δ∈) of 13.5, and a viscosity at room temperature (η, 25° C.) of 30 mPa·s, and a clear point (Tc) of 90.2° C. The instruments for measuring the properties were similar to those in Comparative Example 1. The liquid-crystal mixture E44 was unsuitable for use as the liquid-crystal material of a zoom lens due to its low dielectric anisotropy.

Example 1

The liquid-crystal compound 5BBTB(FF)NCS (See following chemical structure) was mixed with the liquid-crystal mixture IBL-087 in different ratios to form liquid-crystal materials. The properties of the liquid-crystal materials are listed in Table 5, and the instruments for measuring the properties were similar to those in Comparative Example 1.

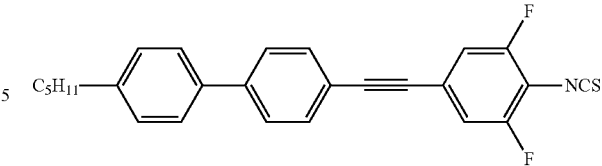

TABLE 5

| 5BBTB(FF)NCS (wt %) | IBL-087 (wt %) | Δn | Δε | η (mPa · s) | Tc |
|---|---|---|---|---|---|
| 5 | 95 | 0.243 | 15.8 | 32 | 93.1° C. |
| 10 | 90 | 0.256 | 15.9 | 34 | 97.8° C. |
| 15 | 85 | 0.268 | 16.0 | 37 | 102.8° C. |

The liquid-crystal compound 5BBTB(FF)NCS had a birefringence (Δn) of 0.489 and a dielectric anisotropy (Δ∈) of 18.7, which were calculated by an extrapolation method. The addition of the liquid-crystal compound 5BBTB(FF)NCS would not dramatically increase the viscosity at room temperature of the liquid-crystal material. The liquid-crystal compound 5BBTB(FF)NCS had a high birefringence (Δn), which may efficiently enhance the birefringence (Δn) of the liquid-crystal material.

As the comparison between Example 1 and Comparative Examples 2 and 3 shows, even if the major structures are similar, the liquid-crystal compound with a —NCS terminal group was more appropriate for use as the liquid-crystal material of a zoom lens (than the liquid-crystal molecule with a —CN terminal group or a —F terminal group).

Example 2

In this example, the composition and related ratio of a liquid-crystal mixture is listed in Table 6.

TABLE 6

| wt % | Chemical structures of liquid-crystal molecules |
|---|---|
| 11 | 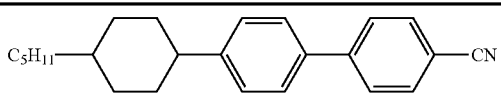 |
| 10.6 | 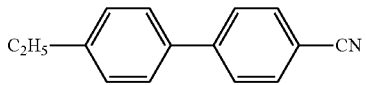 |
| 27 | 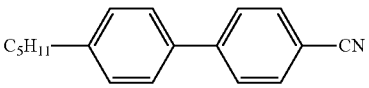 |
| 10.4 | 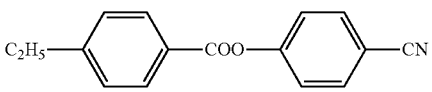 |
| 11 | 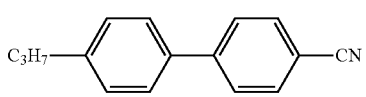 |
| 7 | 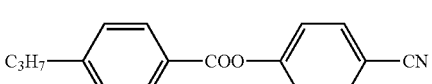 |

TABLE 6-continued

| wt % | Chemical structures of liquid-crystal molecules |
|---|---|
| 3 | (dibenzofuran-alkyne-methylphenyl-alkyne-phenyl-$C_4H_9$ structure) |

Liquid-crystal compounds 5BTBNCS, 5BTB(F)NCS, and 5BBTB(FF)NCS (synthesis thereof could be referred to Chin. J. Chem. 2015, 33, 771-776 and Opto-eletronic Review, 2009, 17(1), 20-24) were collocated with different ratios of the liquid-crystal mixture to form liquid-crystal materials. The properties of the liquid-crystal materials are listed in Table 7, and the instruments for measuring the properties were similar to those in Comparative Example 1.

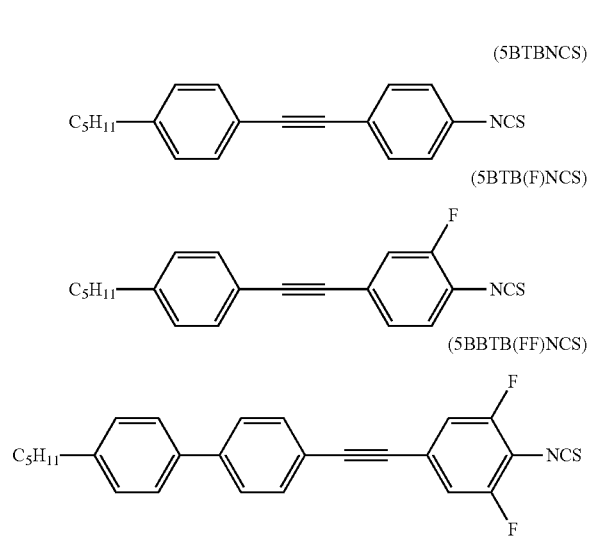

(5BTBNCS)

(5BTB(F)NCS)

(5BBTB(FF)NCS)

TABLE 8

| NCS-containing compound (wt %) | Δn | η |
|---|---|---|
| 0 | 0.229 | 31 |
| 10 | 0.249 | 30 |
| 10 | 0.246 | 29 |
| 14 | 0.257 | 29 |
| 15 | 0.254 | 29 |
| 18 | 0.258 | 30 |
| 20 | 0.261 | 30 |
| 20 | 0.265 | 29 |
| 22 | 0.272 | 31 |
| 25 | 0.279 | 32 |
| 30 | 0.289 | 32 |
| 30 | 0.293 | 34 |
| 35 | 0.303 | 35 |
| 35 | 0.299 | 36 |

As shown above, the liquid-crystal material with 14 wt % of the NCS-containing compound gave a high birefringence (>0.25) without increasing the viscosity at room temperature of the liquid-crystal material. When the NCS-containing compound was over 20 wt %, the liquid-crystal material had a higher birefringence without dramatically increasing the viscosity at room temperature (e.g. 29 mPa·s to 36 mPa·s) of the liquid-crystal material.

Example 3

Figure 5:
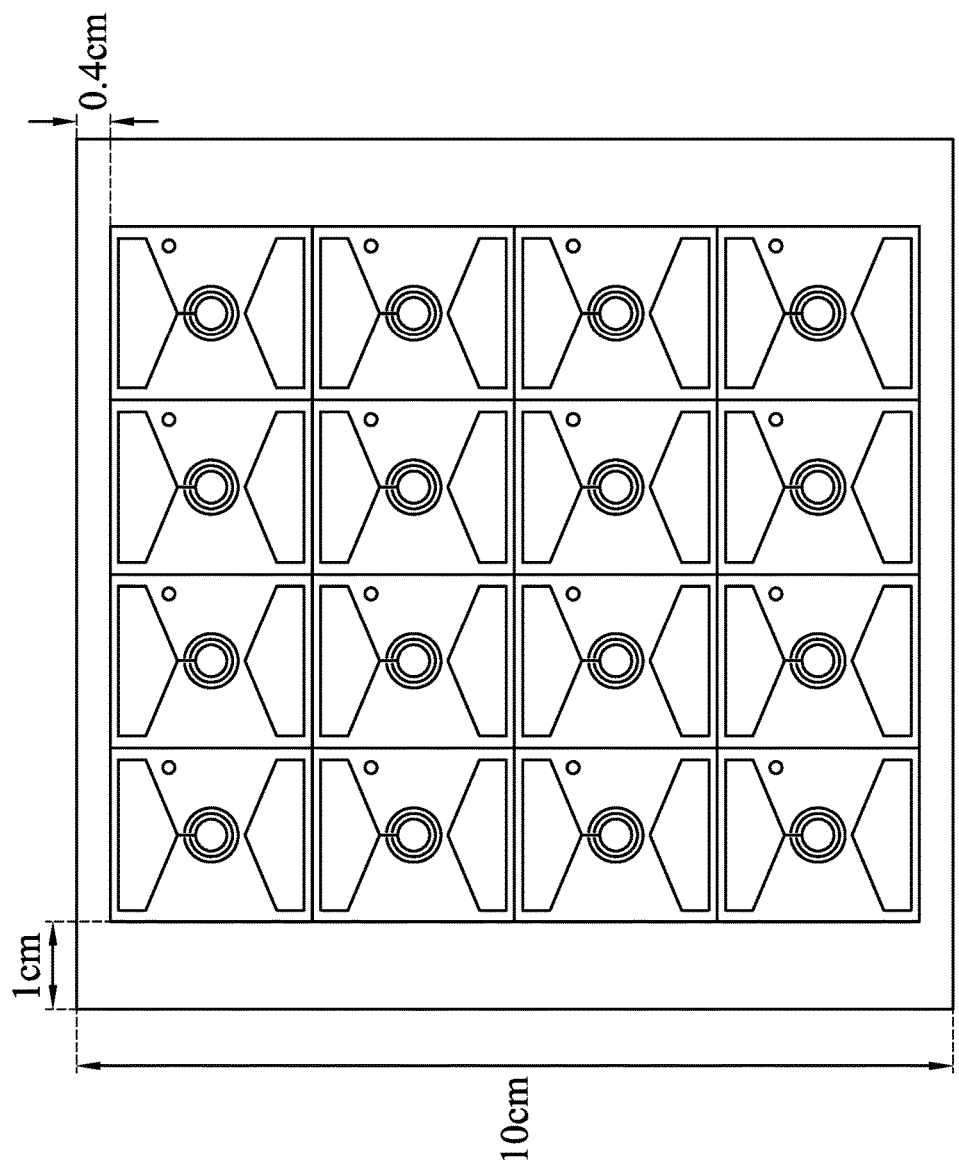
FIG. 5 shows a photomask pattern corresponding to a first electrode, a second electrode, concentric ring electrodes, a ring-shaped circle electrode, and a second trace in one embodiment.

A photomask is designed by the graphic software Auto-CAD, as shown in FIG. 5. An ITO substrate is lithographed through the photomask and etched to define an ITO pattern

TABLE 7

| Formulation No. | 5BTBNCS | 5BTB(F)NCS | 5BBTB(FF)NCS | NCS-containing compound (wt %) | Liquid crystal mixture (wt %) | Δn | Δε | η | Tc | Note |
|---|---|---|---|---|---|---|---|---|---|---|
| Host | 0 | 0 | 0 | 0 | 100 | 0.229 | 15.5 | 31 | 88.3 | Pure liquid-crystal mixture |
| CW-1050223-1 | 2 | 2 | 6 | 10 | 90 | 0.249 | 15.5 | 30 | 88 | |
| CW-1050223-2 | 3 | 3 | 4 | 10 | 90 | 0.246 | 15.4 | 29 | 87.6 | |
| CW-1050223-3 | 4 | 5 | 5 | 14 | 86 | 0.257 | 15.3 | 29 | 86.9 | |
| CW-1050223-4 | 3 | 4 | 8 | 15 | 85 | 0.254 | 15.4 | 29 | 87.1 | |
| CW-1050613-1 | 5 | 5 | 8 | 18 | 82 | 0.258 | 15.2 | 30 | 86.2 | |
| CW-1050613-1 | 5 | 5 | 10 | 20 | 80 | 0.261 | 15.2 | 30 | 85.3 | |
| CW-1050224-5 | 6 | 6 | 8 | 20 | 80 | 0.265 | 15.2 | 29 | 84.5 | |
| CW-1050614-1 | 7 | 7 | 8 | 22 | 78 | 0.272 | 15.2 | 31 | 83.2 | |
| CW-1050224-1 | 7 | 7 | 11 | 25 | 75 | 0.279 | 15 | 31 | 81.4 | |
| CW-1050224-2 | 8 | 8 | 14 | 30 | 70 | 0.289 | 14.5 | 32 | 80.7 | |
| CW-1050224-3 | 7 | 7 | 16 | 30 | 70 | 0.293 | 14.6 | 34 | 81.6 | |
| CW-1050224-4 | 9 | 9 | 16 | 35 | 65 | 0.303 | 14.2 | 35 | 80.5 | |
| CW-1050225-1 | 11 | 11 | 12 | 35 | 65 | 0.299 | 14.2 | 36 | 80.8 | |
| CW-1050225-2 | 10 | 10 | 17 | 37 | 63 | — | — | — | — | Solid precipitation |

Figure 4:
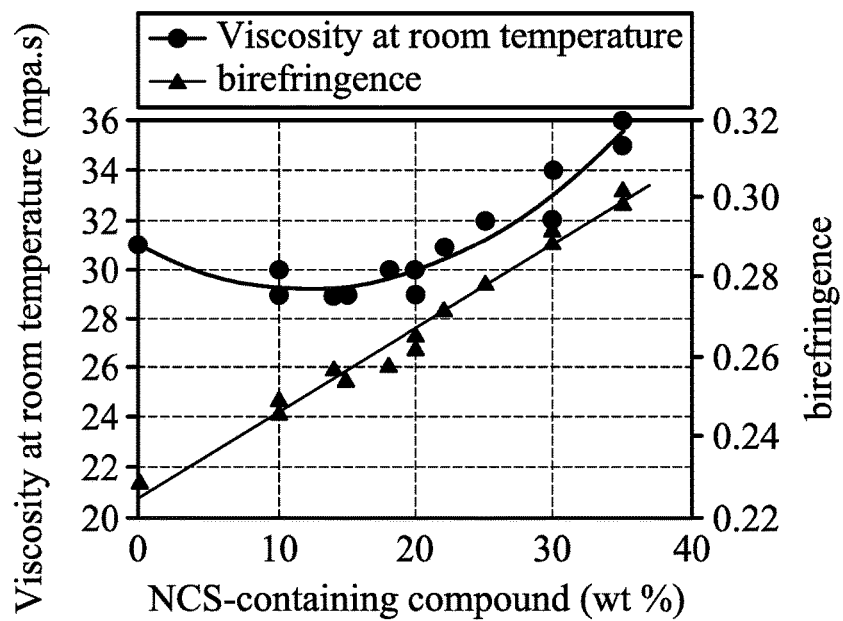
FIG. 4 shows a curve of birefringence versus amount of NCS-containing molecule and a curve of viscosity versus amount of NCS-containing molecule in one embodiment.

The NCS-containing compound ratio, the birefringence, and the viscosity at room temperature in Table 7 are further tabulated in Table 8 and shown in FIG. 4.

on the substrate. The ITO pattern in FIG. 5 includes a plurality of concentric ring electrodes (each including an opening), a ring-shaped electrode in the center, a first electrode, a second electrode, and a second trace connecting the second electrode and the ring-shaped electrode through the openings. However, it should be understood that the innermost electrode can be a filled circle electrode, too.

The substrate with the ITO pattern was immersed in acetone to be vibrated in a supersonic vibrator for 15 minutes, immersed in isopropyl alcohol to be vibrated in the supersonic vibrator for 15 minutes, and then immersed in a glass detergent solution to be vibrated in the supersonic vibrator for 15 minutes. The cleaned substrate was dried by nitrogen flush, and then heated to 110° C. and kept at 110° C. for 1 hour on a hot plate. After no moisture remained on the substrate, the substrate was cooled to room temperature.

A PEDOT:PSS ink (commercially available from Sigma-Aldrich) was diluted to 5 wt % by 99% ethyl alcohol, and then filtered through a filter with a pore size of 0.45 μm to remove overly large particles. The filtrate was vibrated in the supersonic vibrator to be evenly mixed, and then put into an atomizer. The ink solution was vibrated to transfer to aerosol, and then spray coated to form a first trace by a nozzle with a pipe diameter of 100 μm. The first trace extended from the ring-shaped electrode to the first electrode outside the outermost concentric ring electrode. After the spray coating, the substrate was directly put onto the hot plate and heated to 120° C. and kept at 120° C. for 1 hour.

Subsequently, 1 part by weight of PI (polyimide, PIA-5370-33C) and 1 part of solvent (NBC-776) were evenly mixed to form a PI solution, and then spin-on coated (500 rpm) on the substrate with the electrode pattern and the first trace. The substrate coated with the PI was then put onto the hot plate, soft-baked at 80° C. for 30 minutes, and then hard-baked at 200° C. for 2 hours to form an alignment layer. The alignment layer was then rubbed by a rubbing machine to achieve a stable alignment effect.

Spacers of 28 μm and UV glue (NOA-65, commercially available from Norland Inc.) were evenly mixed, and the mixture was then dispensed on sides of the top surface of the substrate by a dispenser. Another substrate was attached to the substrate, and the UV glue was cured by UV to form a liquid-crystal cell with a uniform space. Electric lines were welded onto the ITO ends of the substrate for driving the electrode pattern. The liquid-crystal material was dripped into the interfaces of the substrates, thereby filling the gap of the liquid-crystal cell by capillary force. As such, a zoom lens was completed.

Figure 6:
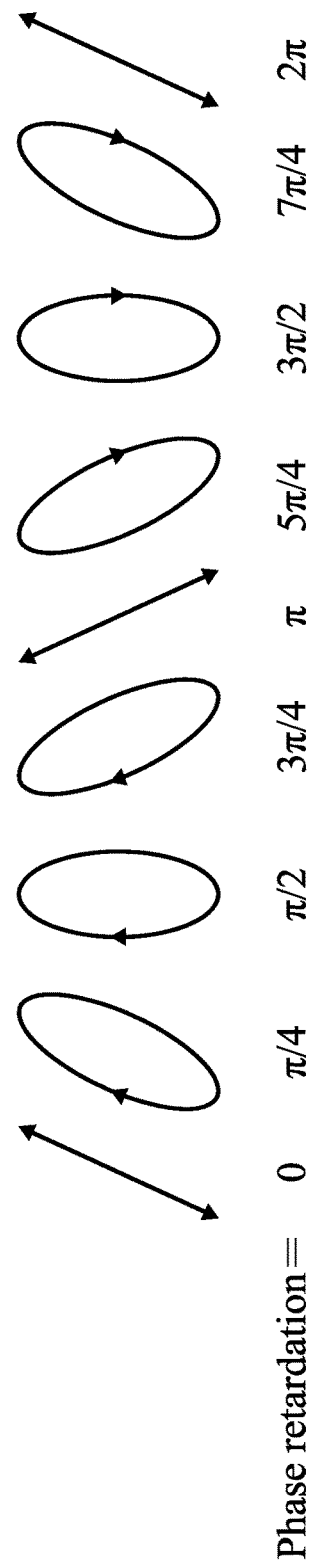
FIG. 6 shows polarization states of a linear polarized light passing through liquid-crystal molecules of different tilt angles in one embodiment.
Figure 7:
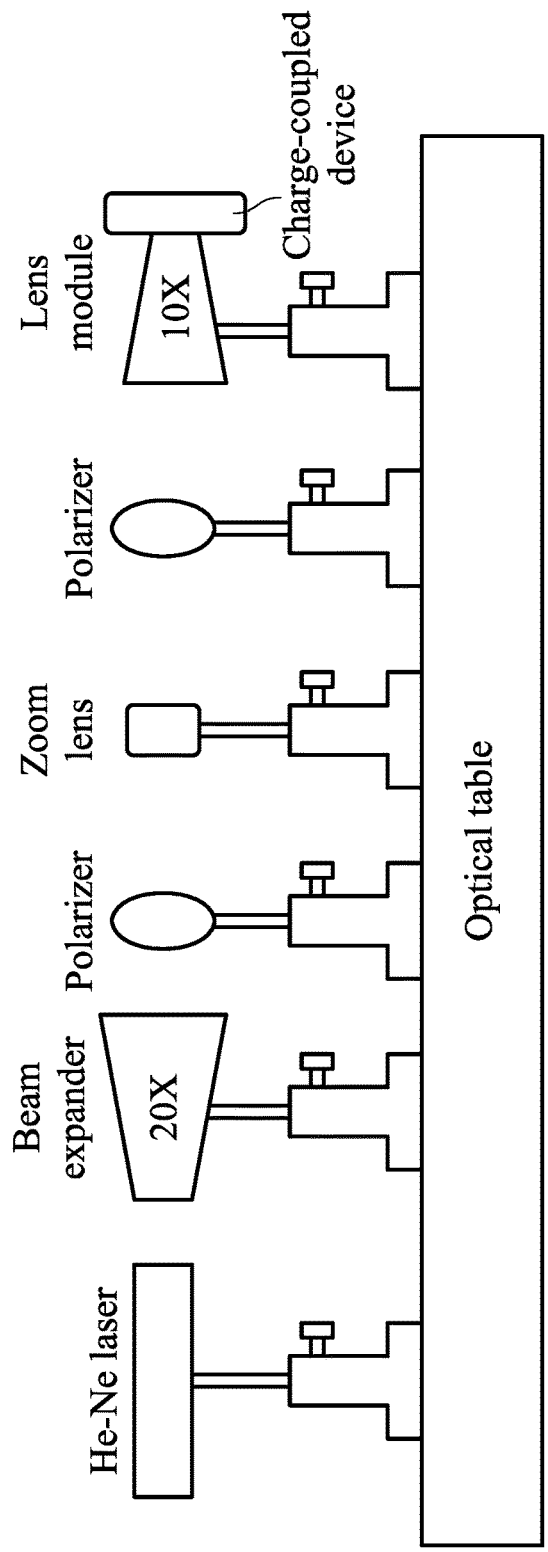
FIG. 7 shows a system of measuring the polarization states of the linear polarized light in one embodiment.

The liquid-crystal molecules had different continuous tilt degrees under a vertical polarizer. The tilt degrees of the liquid-crystal molecules can be changed to fine-tune the polarized light phase passing through the liquid-crystal molecules, as shown in FIG. 6. If a linear polarized light passes through the liquid-crystal molecules of different tilt angles, the polarization state will be changed by the phase retardation amount, and the measuring system is shown in FIG. 7. The system can be used to measure the focal length and the focus time of the zoom lens.

Figure 8:
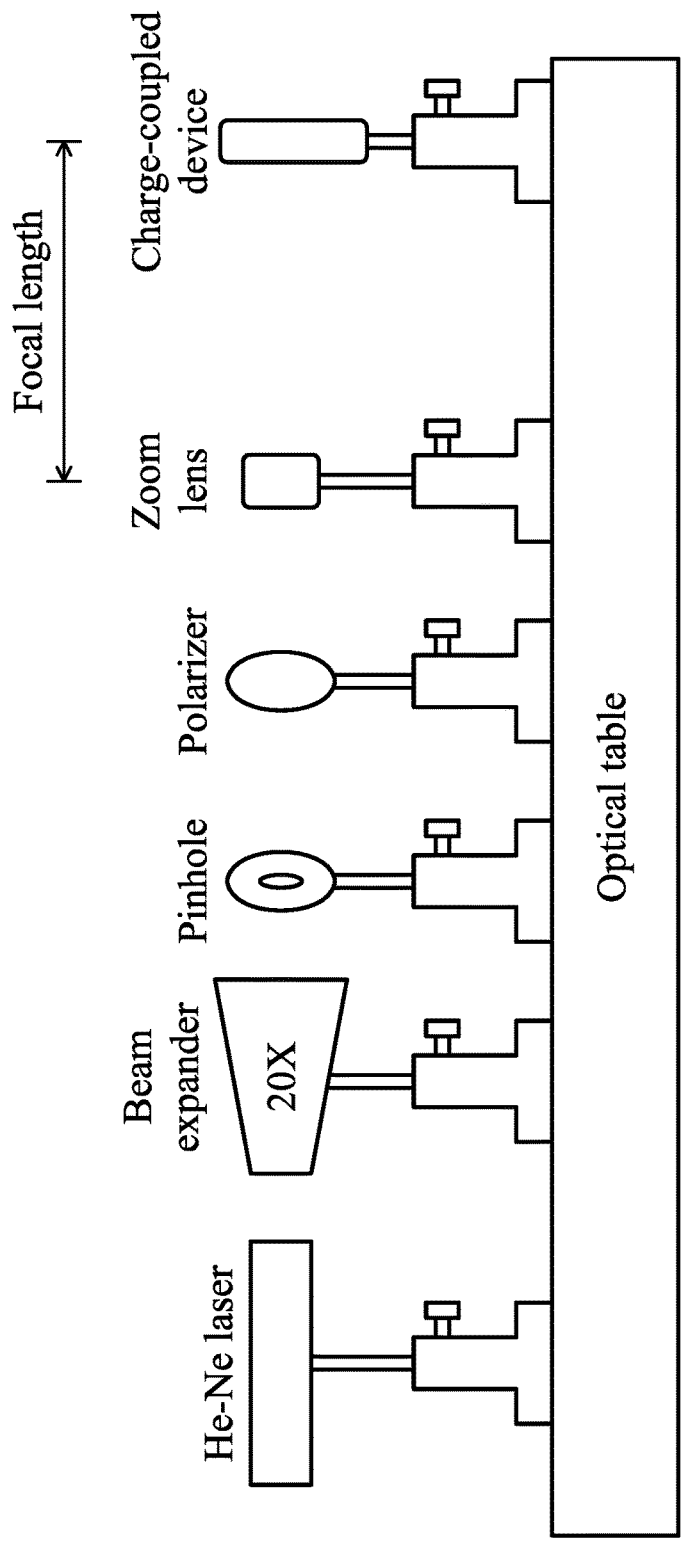
FIG. 8 shows a system of measuring the focal length of a zoom lens.

A linear polarized light with a direction similar to the alignment direction was provided by a laser source. The linear polarized light entered the zoom lens, and the location of the receiving end (e.g. charge-coupled device, CCD) was correspondingly fine-tuned. When the focus point was at a minimum, the distance between the zoom lens and the CCD was the focal length of the zoom lens. The system for measuring the focal length of the zoom lens is shown in FIG. 8.

In addition, the response speed of the liquid-crystal materials could be measured by an instrument DMS 803 commercially available from Autrinic-Melchers.

When the liquid-crystal material in the zoom lens was CW-1050224-5 in Example 2, the zoom lens had a driving voltage of 5V and a shortest focal length of 12 cm. When the liquid-crystal material in the zoom lens was the commercially available liquid-crystal material E44, the zoom lens had a driving voltage of 5V and a shortest focal length of 15 cm. Accordingly, the liquid-crystal material including the NCS-containing compound could collocate with the specific electrode pattern (e.g. a plurality of concentric ring electrodes and a first trace connecting the concentric ring electrodes) for efficiently decreasing the shortest focal length of the zoom lens.

A conventional zoom lens (as mentioned in Optics Express 18, 18506-18508 (2010)) had a driving voltage of 10V and a shortest focal length of 18 cm. The electrode pattern of this zoom lens included a plurality of rings with different widths, and the liquid-crystal material (E7, commercially available from Merck) of the zoom lens had a birefringence of 0.224, a dielectric anisotropy of 14.0, and a viscosity at room temperature of 36 mPa·s. Another conventional zoom lens (as mentioned in Optics. Express 14, 11292 (2006)) had a driving voltage of 140V and a shortest focal length of 96 cm. The electrode pattern of this zoom lens included a spherical surface, and the liquid-crystal material (IBL-038, commercially available from Merck) of the zoom lens had a birefringence of 0.272 and a dielectric anisotropy of 16.4. Compared to conventional zoom lenses, the zoom lenses in the Examples had a shorter shortest focal length and a lower driving voltage.

It will be apparent to those skilled in the art that various modifications and variations can be made to the disclosed methods and materials. It is intended that the specification and examples be considered as exemplary only, with the true scope of the disclosure being indicated by the following claims and their equivalents.

What is claimed is:

1. A zoom lens, comprising:
an electrode pattern on a substrate; and
a liquid-crystal material on the electrode pattern,
wherein the electrode pattern includes:
   a plurality of concentric ring electrodes surrounding an innermost electrode, and each of the concentric ring electrodes has an opening,
   a first trace extending from a first electrode out of an outermost concentric ring electrode to the innermost electrode, wherein the first trace has greater resistance than that of the concentric ring electrodes and the innermost electrode; and
   a second trace connecting the innermost electrode and a second electrode out of the outermost concentric ring electrode through the openings,
wherein the liquid-crystal material includes a liquid-crystal compound with a chemical structure of

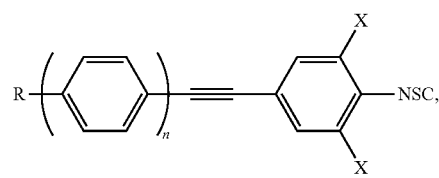

wherein R is $C_{4-10}$ alkyl group, n=1 or 2, and each of X is independently H or F.

2. The zoom lens as claimed in claim 1, wherein the concentric ring electrodes, the innermost electrode, and the second trace include transparent conductive oxide, and the first trace includes a transparent conductive polymer.

3. The zoom lens as claimed in claim 2, wherein the transparent conductive oxide includes indium tin oxide, indium zinc oxide, or aluminum zinc oxide.

4. The zoom lens as claimed in claim 2, wherein the transparent conductive polymer includes poly(3,4-ethylenedioxythiophene):polystyrene sulfonate.

5. The zoom lens as claimed in claim 1, wherein the innermost electrode is a ring-shaped electrode or a filled circle electrode.

6. The zoom lens as claimed in claim 1, wherein 100 parts by weight of the liquid-crystal material includes 14 to 35 parts by weight of the liquid-crystal compound.

7. The zoom lens as claimed in claim 1, wherein 100 parts of the liquid-crystal material includes 3 to 11 parts by weight of

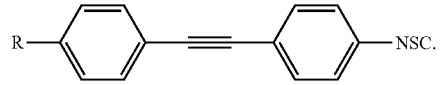

8. The zoom lens as claimed in claim 1, wherein 100 parts of the liquid-crystal material includes 4 to 11 parts by weight of

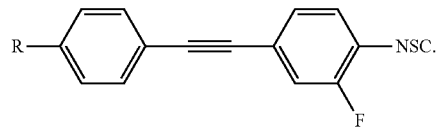

9. The zoom lens as claimed in claim 1, wherein 100 parts of the liquid-crystal material includes 5 to 16 parts by weight of

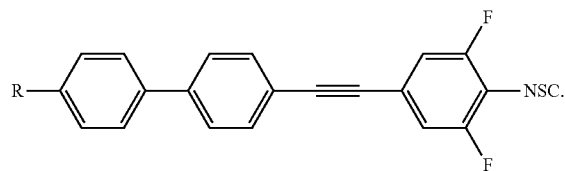

10. The zoom lens as claimed in claim 1, wherein the liquid-crystal material has a birefringence of 0.25 to 0.31 and a viscosity at room temperature of 29 mPa·s to 36 mPa·s.

11. A method of manufacturing a zoom lens, comprising:
depositing a transparent conductive oxide on a substrate;
patterning the transparent conductive oxide by lithography and etching to form a plurality of concentric ring electrodes surrounding an innermost electrode, a first electrode, a second electrode, and a second trace, wherein the first electrode and the second electrode are disposed outside an outermost concentric ring electrode, each of the concentric ring electrodes has an opening, and the second trace connects the innermost electrode and the second electrode through the openings;
spray coating a transparent conductive polymer to form a first trace, wherein the first trace extends from the first electrode to the innermost electrode, wherein the first trace has greater resistance than that of the concentric ring electrodes, the innermost electrode, the first electrode, the second electrode, and the second trace; and
forming a liquid-crystal material on the concentric ring electrodes, the innermost electrode, the first electrode, the second electrode, the first trace, and the second trace,
wherein the liquid-crystal material includes a liquid-crystal compound with a chemical structure of

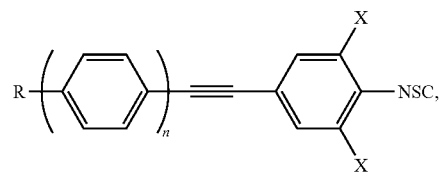

wherein R is $C_{4-10}$ alkyl group, n=1 or 2, and each of X is independently H or F.

12. The method as claimed in claim 11, wherein the innermost electrode is a ring-shaped electrode or a filled circle electrode.

13. The method as claimed in claim 11, wherein 100 parts of the liquid-crystal material includes 14 to 35 parts by weight of the liquid-crystal compound.

14. The method as claimed in claim 11, wherein 100 parts of the liquid-crystal material includes 3 to 11 parts by weight of

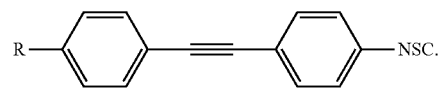

15. The method as claimed in claim 11, wherein 100 parts of the liquid-crystal material includes 4 to 11 parts by weight of

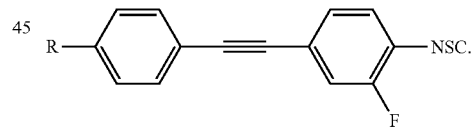

16. The method as claimed in claim 11, wherein 100 parts of the liquid-crystal material includes 5 to 16 parts by weight of

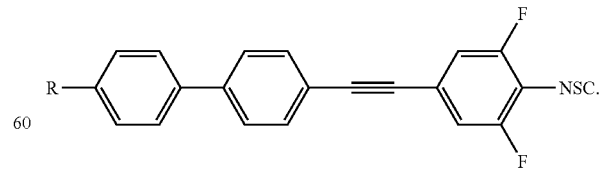

* * * * *